US012779426B2

(12) United States Patent
Cantrell et al.

(10) Patent No.: US 12,779,426 B2
(45) Date of Patent: Nov. 3, 2026

(54) COMPOSITION AND METHOD FOR SORBING MOBILIZED METAL

(71) Applicant: Lithified Technologies Group, LLC, Santa Fe, NM (US)

(72) Inventors: Joshua Cantrell, Kailua-Kona, HI (US); Carlos Roybal, Pecos, NM (US); Robert Sherwin, Santa Fe, NM (US)

(73) Assignee: Lithified Technologies Group, LLC, Santa Fe, NM (US)

(*) Notice: Subject to any disclaimer, the term of this patent is extended or adjusted under 35 U.S.C. 154(b) by 1009 days.

(21) Appl. No.: 17/876,366

(22) Filed: Jul. 28, 2022

(65) Prior Publication Data

US 2023/0030492 A1 Feb. 2, 2023

Related U.S. Application Data

(60) Provisional application No. 63/226,412, filed on Jul. 28, 2021.

(51) Int. Cl.

*B01J 20/16* (2006.01)
*B01J 20/02* (2006.01)
*B01J 20/04* (2006.01)
*B01J 20/12* (2006.01)

(52) U.S. Cl.

CPC ........... *B01J 20/16* (2013.01); *B01J 20/0229* (2013.01); *B01J 20/041* (2013.01); *B01J 20/043* (2013.01); *B01J 20/12* (2013.01); *B01J 2220/42* (2013.01)

(58) Field of Classification Search

None

See application file for complete search history.

(56) References Cited

U.S. PATENT DOCUMENTS

| | | | |
|---|---|---|---|
| 3,158,579 A | 11/1964 | Pollitzer et al. | |
| 3,345,858 A | 10/1967 | Fenske | |
| 4,778,628 A | 10/1988 | Saha et al. | |
| 5,090,843 A * | 2/1992 | Grigsby | E02D 31/00 405/129.9 |
| 5,174,819 A | 12/1992 | Carlson | |
| 5,273,728 A | 12/1993 | Doty | |
| 5,562,586 A | 10/1996 | Hyde-Smith | |
| 5,961,437 A | 10/1999 | Smith et al. | |

(Continued)

FOREIGN PATENT DOCUMENTS

| | | |
|---|---|---|
| DE | 19540387 A1 | 5/1996 |
| WO | 0240799 A1 | 5/2002 |

(Continued)

OTHER PUBLICATIONS

"Life of Mine Conference 2021", 2021.
"The longterm stabilization of uranium mill tailings", IAEA, 2004.

*Primary Examiner* — Jeffrey D Washville
(74) *Attorney, Agent, or Firm* — Peacock Law P.C.; Marco H. Santamaria; Justin R. Jackson

(57) ABSTRACT

A composition and method for sorbing a mobilized metal which can optionally include uranium, and which can optionally be used for capping uranium-containing mining tailings. The method can include forming a layered structure atop the metal-containing mining tailings which sorbs the metal and prevents it from being discharged as surface water runoff and which prevents it from being released into groundwater.

8 Claims, 6 Drawing Sheets

(56) References Cited

U.S. PATENT DOCUMENTS

| | | | |
|---|---|---|---|
| 6,004,069 | A | 12/1999 | Sudbury |
| 6,851,891 | B2 | 2/2005 | Baumgartner et al. |
| 7,250,119 | B2 | 7/2007 | Sayala |
| 2010/0200465 | A1 * | 8/2010 | Dana ....................... C10B 53/06 196/46 |
| 2013/0272795 | A1 | 10/2013 | Hull |
| 2014/0209512 | A1 * | 7/2014 | Alvarez .................. C10G 1/04 208/390 |
| 2014/0363240 | A1 | 12/2014 | Putman et al. |
| 2018/0025799 | A1 | 1/2018 | Kim et al. |
| 2026/0171276 | A1 | 6/2026 | Bussod et al. |

FOREIGN PATENT DOCUMENTS

| | | | |
|---|---|---|---|
| WO | 2006099611 | A1 | 9/2006 |
| WO | 2017178708 | A1 | 10/2017 |
| WO | 2026128920 | A1 | 6/2026 |

* cited by examiner

| Size Fraction | Sample Mass (g) | GrainSize Distribution (wt%) |
|---|---|---|
| Gravel (> 1cm diam.) removed from > 2 mm size fraction | 360 | 10.60 |
| > 2 mm | 1360.63 | 40.07 |
| 500 - 2,000 μm | 689.98 | 20.32 |
| 250 - 500 μm | 343.51 | 10.12 |
| 75 - 250 μm | 417.06 | 12.28 |
| < 75 μm | 224.07 | 6.60 |
| **TOTAL** | 3395.25 | 100 |

FIG. 6

COMPOSITION AND METHOD FOR SORBING MOBILIZED METAL

CROSS-REFERENCE TO RELATED APPLICATIONS

This application claims priority to and the benefit of the filing of U.S. Provisional Patent Application No. 63/226,412, entitled "Composition and Method for Sorbing Mobilized Uranium", filed on Jul. 28, 2021, and the specification thereof is incorporated herein by reference.

BACKGROUND OF THE INVENTION

Embodiments of the present invention relate to a composition for capturing and immobilizing mineral tailings or other uranium-containing materials.

There are over 15,000 abandoned uranium mines ("AUMs") spread across 15 Western United States affecting over 10 Million people living within 50 miles of these sites. Over 75% of these AUMs are located on federal tribal lands yet there are no federal laws that require clean-up of these legacy sites even though they remain radioactive for hundreds of thousands of years. At this point radioactive uranium and heavy metal contamination is threatening half of the western U.S. water supply and radioactive dust and tailings that are not properly capped and/or remediated are exposed to eolian and water transport and can travel for hundreds of miles from the source. The Navajo Nation covers 27,413 square miles and spans three Western states. Their territory has over 521 AUMs that have been linked to ground water pollution and their cancer rate throughout the population is ten times higher than anywhere else in the U.S.

Current AUM capping designs are composed of either (i) a hard concrete cap underlain by a layer of clay, (ii) a top unconsolidated layer of aggregate material overlying interlayered clay and sand sediments, or (iii) covered with unconsolidated burial fill. The principal issue with these AUM capping designs is that they are susceptible to the early onset of shrink/swell in the clay layers, resulting in cracking and infiltration of the overlying concrete or aggregate layer. All three barrier designs are subject to disaggregation and subsequent eolian and surface water erosion by heavy rainfalls and flash floods. The resulting consequence of these systems is that uranium contaminant is remobilized and transported miles away to inhabited areas by streams and lakes and dispersed as fine contaminated dust and small particles hundreds of miles away by 30-50 mi/h winds (e.g., conditions prevalent around the Navajo Nation and surrounding territories). What is needed is a durable mechanical and hydrochemical barrier that (i) mechanically stabilizes solid uranium tailings, and (ii) mitigates uranium remobilization by subsurface transport of aqueous U.

BRIEF SUMMARY OF EMBODIMENTS OF THE PRESENT INVENTION

Embodiments of the present invention relates to a composition for sorbing a metal, the composition comprising: calcium carbonate; calcium alumino silicate; a clay; and a metal oxide. In one embodiment, the metal oxide can include magnesium oxide. The metal oxide can include iron(III) oxide. The composition can include quartz and/or feldspar. Optionally, the metal can be uranium. The clay can include bentonite.

Embodiments of the present invention also relate to a system for capping mineral tailings, the system including a first layer; a second layer, wherein the second layer is impermeable; and a third layer including a composition for sorbing metal. The composition for sorbing metal can include calcium carbonate; calcium alumino silicate; a clay; and a metal oxide. Optionally, the metal oxide can include magnesium oxide. The composition for sorbing metal can include an unconfined compressive strength of at least about 8 MPa. The composition for sorbing metal can include a Young's modulus of at least about 2000 MPa. The metal can be uranium. The first layer can be at least partially disposed above the second layer and the third layer. The second layer can be at least partially disposed above the third layer. The third layer can include a metal sorption coefficient of at least about 10.

Embodiments of the present invention also relate to a method for preparing a composition for sorbing metal, the method including contacting calcium carbonate with a base aggregate, a clay, and a metal oxide. The method can also include contacting the base aggregate with a lithifying formula. The lithifying formula can include calcium carbonate. The lithifying formula can optionally include calcium alumino silicate.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 6 is a table showing the grain size distribution of uranium sorbing compositions.

DETAILED DESCRIPTION OF THE INVENTION

Embodiments of the present invention are directed to a composition for sorbing uranium, the composition comprising: calcium carbonate; a calcium alumino silicate material; a clay; and a metal or metal oxide. In one embodiment, the composition further comprises quartz, feldspar, periclase, magnesium oxide, calcium sulfate, or a combination thereof. Optionally, the composition can comprise plagioclase feldspar, quartz, or a combination thereof.

In one embodiment, the composition for sorbing uranium is comprised within a system for capping mineral tailings, the system comprising: a first layer; a second layer, wherein the second layer is impermeable; and a third layer comprising a composition for sorbing uranium. Optionally, the first layer is preferably resistant to UV radiation damage and/or large temperature gradients. The second layer can be resistant to cracking and infiltration.

Embodiments of the present invention also relate to a method for preparing a composition for sorbing uranium, the method comprising: contacting calcium carbonate with a calcium alumino silicate material; a clay; and a metal oxide. The method can also comprise contacting a base aggregate with a lithifying formula; a clay; and a metal or metal oxide. The method can also include mixing a base aggregate with a lithifying formula, a clay, and a metal or metal oxide to form a mixture.

The term "metal" or "metals" is defined in the specification, drawings, and claims as a compound, mixture, or substance comprising a metal atom. The term "metal" or "metals" includes, but is not limited to, metal hydroxides, metal oxides, metal salts, elemental metals, metal ions, non-ionic metals, minerals, or a combination thereof.

The term "aggregate" is defined in the specification, drawings, and claims as a material comprising coarse- and/or medium-grained particulate matter. The aggregate may include, but is not limited to, sand, gravel, stone, slag, rock, or a combination thereof.

Figure 1:
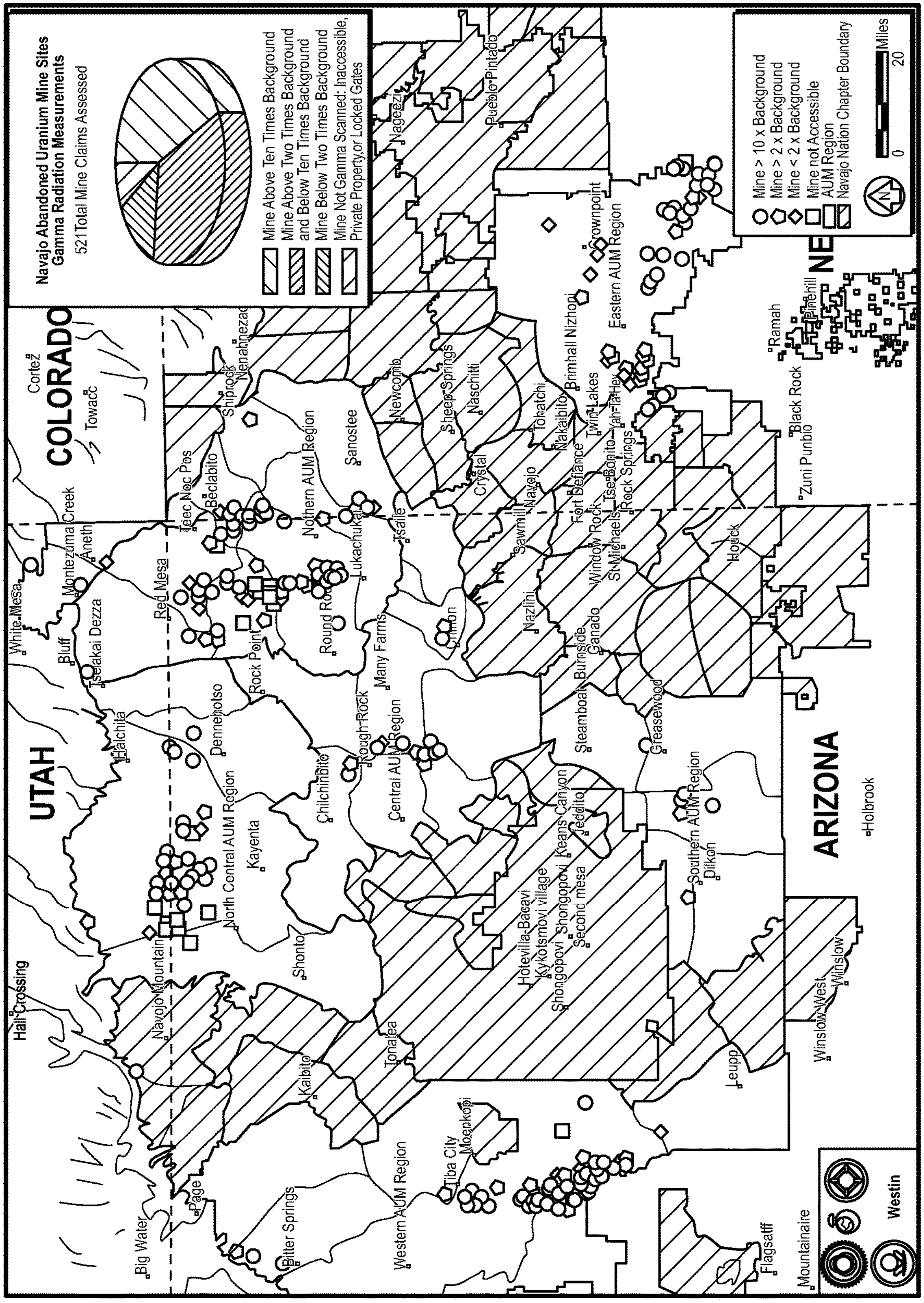
FIG. 1 is a map of the Navajo Nation with the location of 521 AUMs distributed throughout the area overlapping the states of Arizona, Colorado and New Mexico.

Turning now to the figures, FIG. 1 shows a map of the Navajo Nation with the location of 521 AUMs distributed throughout the area overlapping the states of Arizona, Colorado and New Mexico. AUMs with gamma-radiation values 10 times over background are shown with circles.

Figure 2:
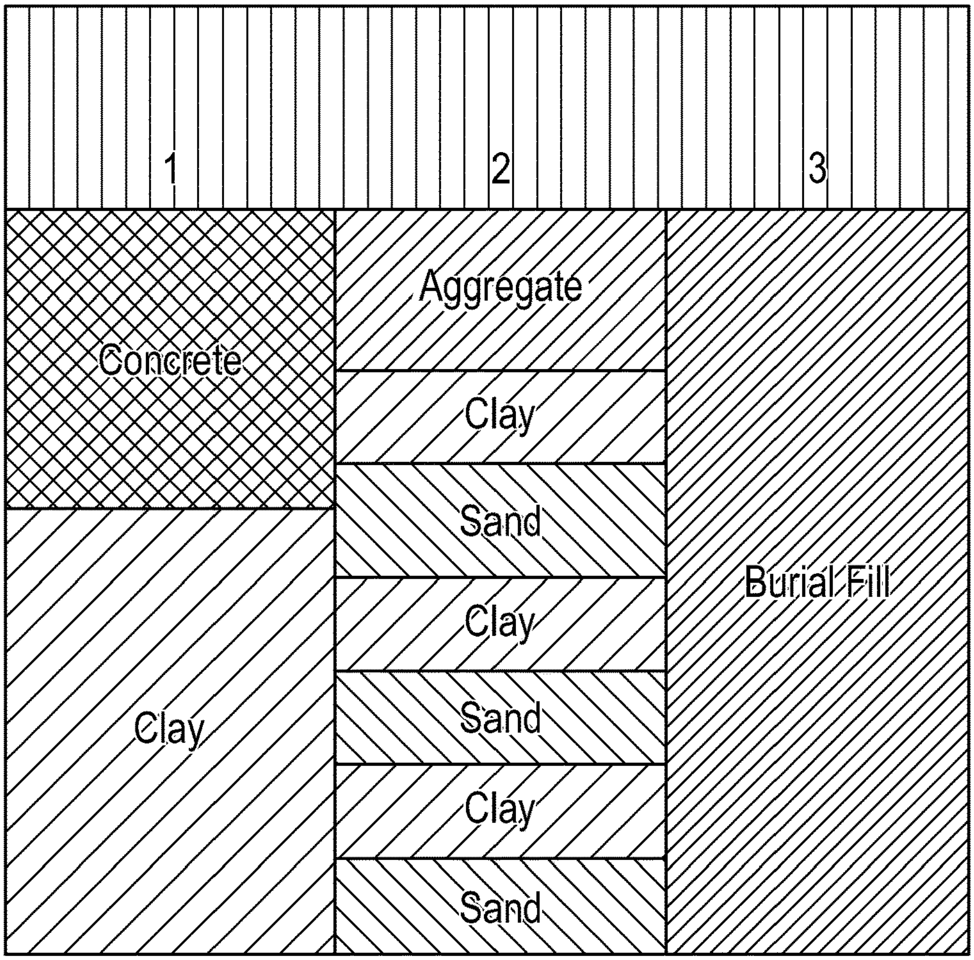
FIG. 2 is a diagram of known AUM capping methods.

FIG. 2 shows AUM capping methods, designated 1, 2, and 3. Capping method 1 is concreted disposed above clay. Capping method 2 is aggregate disposed over alternating layers of sand and clay. Capping method 3 is burial fill.

Figure 3:
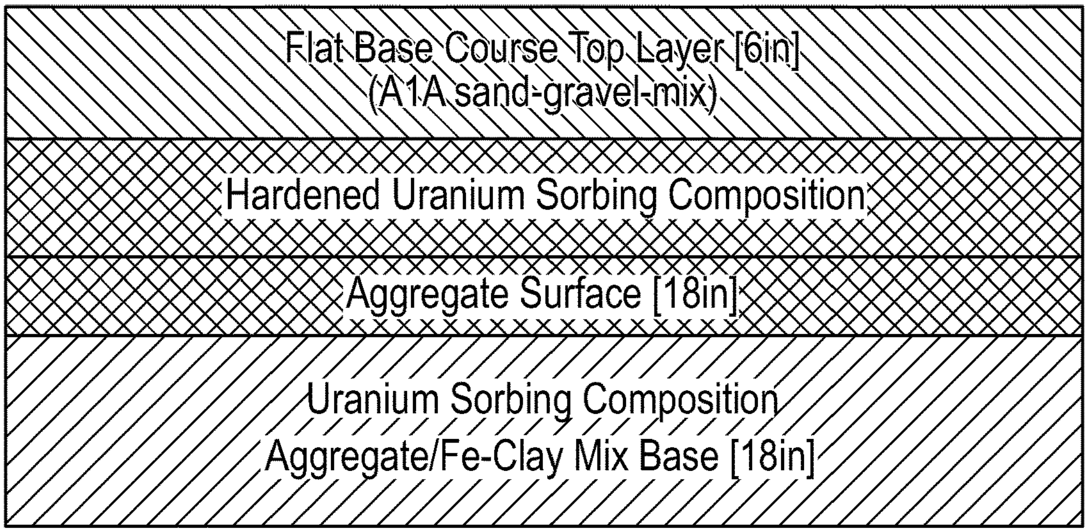
FIG. 3 is a diagram of an AUM cap incorporating a layer composition that promotes aqueous uranium sorption.

FIG. 3 shows an AUM cap incorporating a layer composition that promotes aqueous uranium sorption. A layer of uranium sorbing composition, and aggregate and/or iron-clay mix base is at least partially disposed below an aggregate surface layer. The aggregate surface layer is at least partially disposed below a hardened uranium sorbing composition. The hardened uranium sorbing composition is at least partially disposed below a flat base course top layer. The uranium sorbing composition, and aggregate and/or iron-clay mix base layer and aggregate surface layer may be about 18 inches in depth. The flat base course top layer may be about 6 inches in depth.

Figure 4:
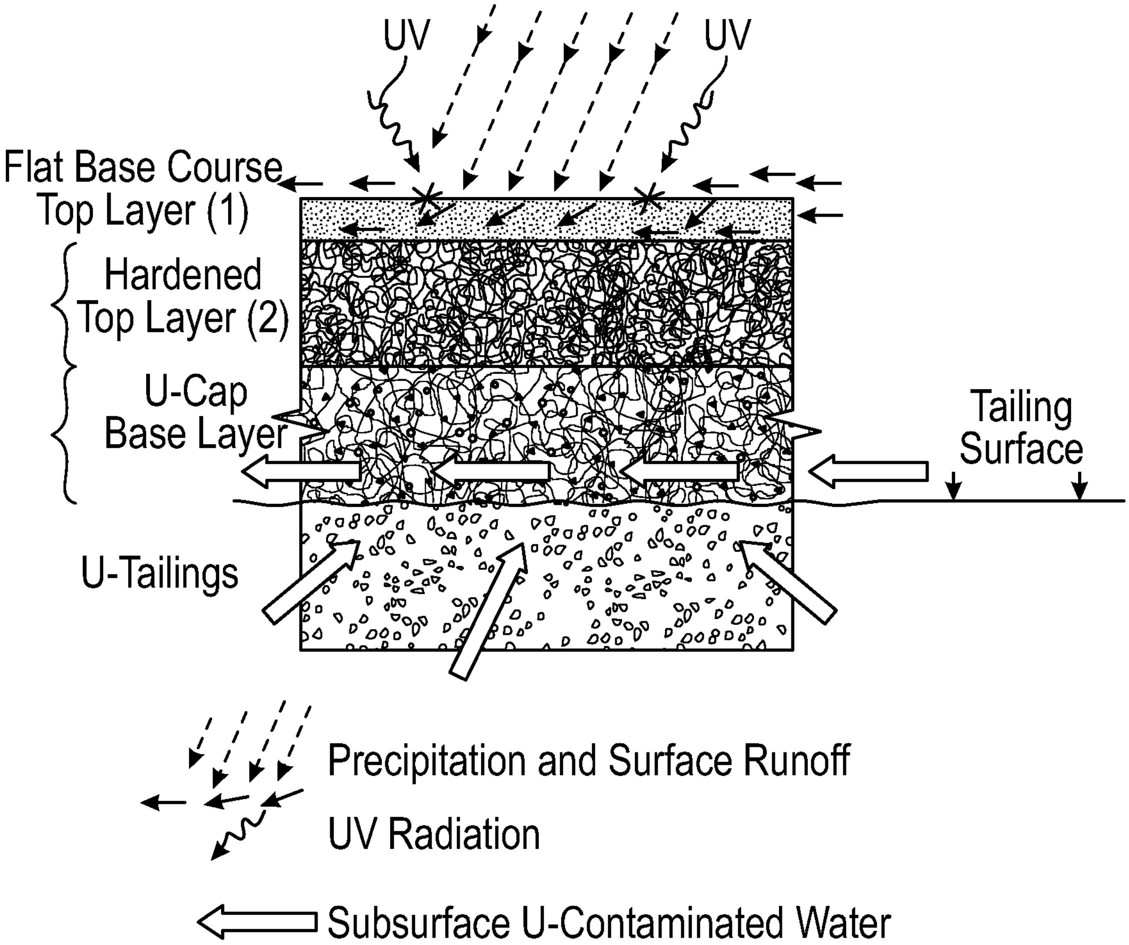
FIG. 4 is a diagram showing how precipitation enters a uranium tailing to mobilize uranium ions and form contaminated water.

FIG. 4 shows how precipitation enters a uranium tailing to mobilize uranium ions and form contaminated water. UV radiation, precipitation, and surface runoff degrade the flat base course top layer (1), allowing water to permeate through the hardened top layer (2) and the uranium cap ("U-cap") base layer and reach the tailing surface. Water contacts the uranium tailings to become contaminated with uranium. The subsurface uranium-contaminated water then moved laterally through the U-cap base layer to enter uncapped regions and/or groundwater.

Figure 5:
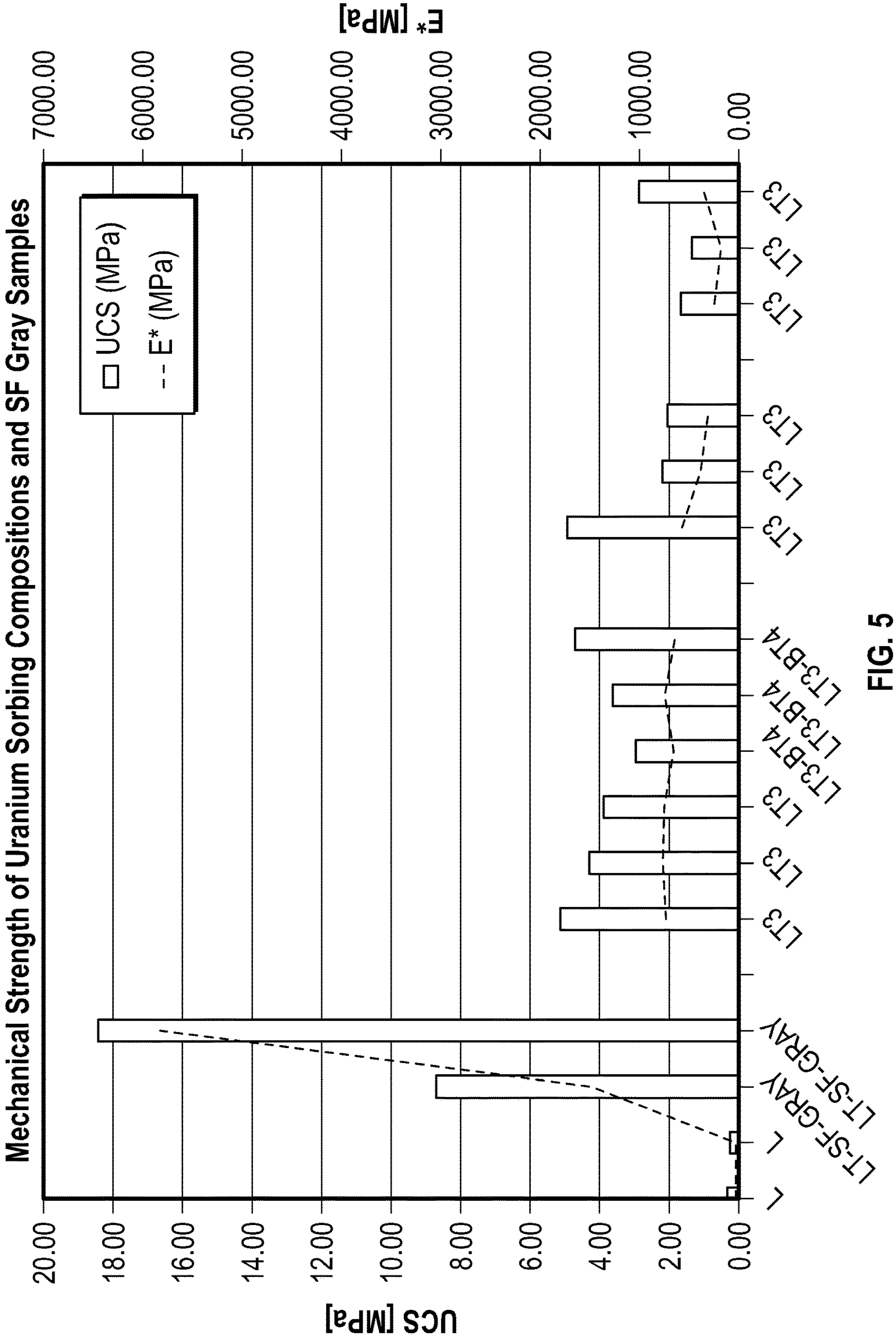
FIG. 5 is a graph showing a summary of mechanical tests for all uranium sorbing compositions.

FIG. 5 shows a summary of mechanical tests for all uranium sorbing compositions. The summary shows the unconfined compressive strength and Young's modulus for uranium sorbing compositions and SF Gray samples. The uranium sorbing compositions had greater unconfined compressive strength and Young's moduli compared to the SF Gray samples.

FIG. 6 shows the grain size distribution of uranium sorbing compositions. The grain size distribution ranges from 6.6 wt % to 10.6 wt % for sample masses of 224.07 g to 360 g.

Figure 7:
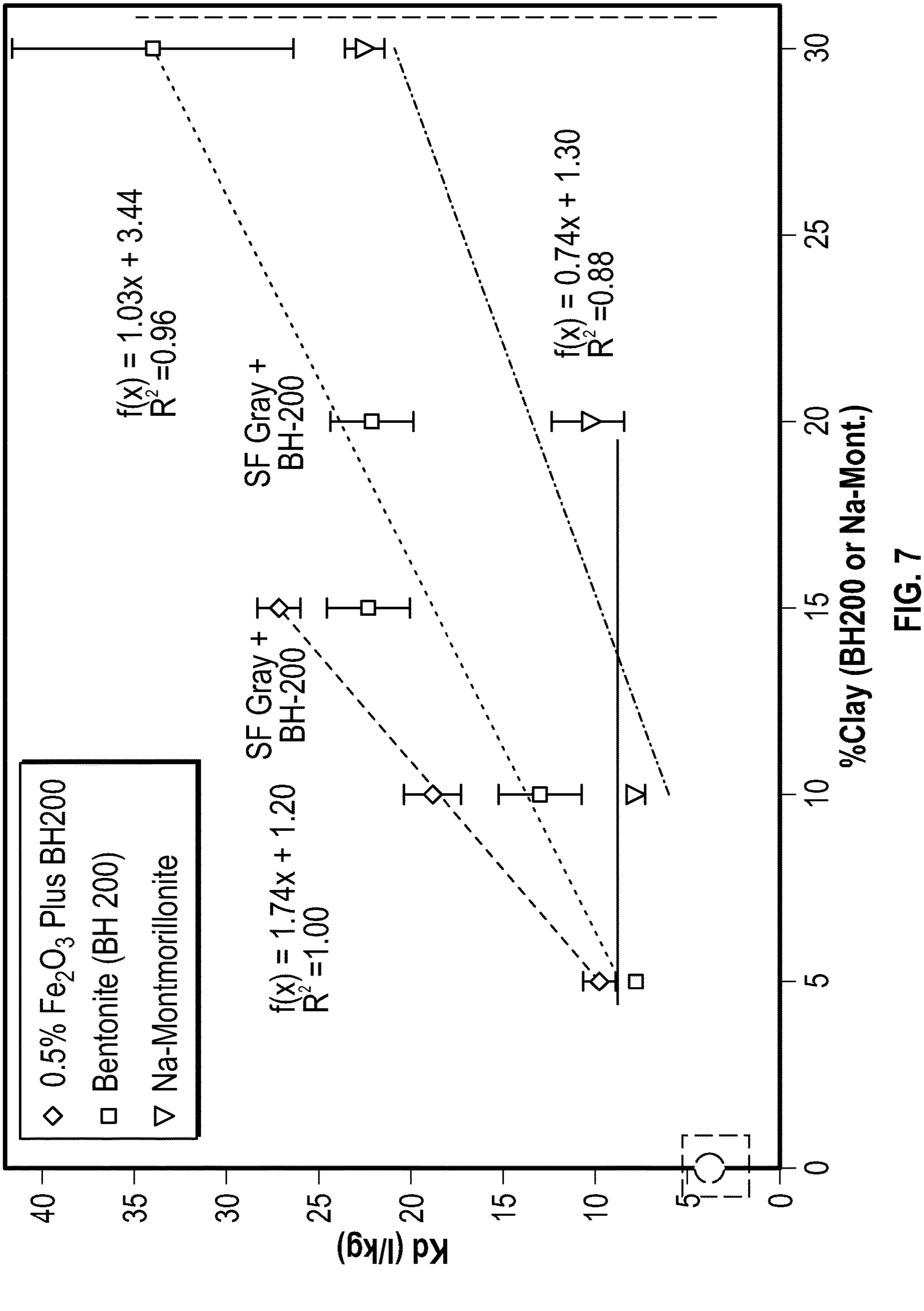
FIG. 7 is a graph comparing the uranium sorption capacities for uranium sorbing compositions.

FIG. 7 shows the uranium sorption capacities for uranium sorbing compositions with different clay agents for a given percentage of clay. Uranium sorbing compositions with SF Gray and BH-200 demonstrated the greatest uranium sorption capacity for clay percentages above 15%. Uranium sorption compositions with SF Gray, BH-200 and 0.5% $Fe_2O_3$ demonstrated the greatest uranium sorption capacity for clay percentages between 5% and 15%.

The composition can optionally comprise a base aggregate. The base aggregate can comprise calcium carbonate, quartz, feldspar, and/or a combination thereof. The base aggregate can comprise at least about 35%, about 35% to about 50%, about 40% to about 45%, or about 50% calcium carbonate by weight. The base aggregate can also comprise about 47% calcium carbonate by weight. The base aggregate can comprise at least about 25%, about 25% to about 45%, about 30% to about 40%, or about 45% quartz by weight. The base aggregate can also comprise about 36% quartz by weight. The base aggregate can comprise at least about 12%, about 12% to about 20%, about 14% to about 18%, or about 20% feldspar by weight.

The composition can optionally comprise a lithifying formula. The lithifying formula can comprise calcium aluminosilicate material. The material can comprise minerals. The lithifying formula can comprise at least about 80%, about 80% to about 99%, about 85% to about 97%, about 90% to about 95%, or about 99% calcium alumino silicate material by weight. The lithifying formula can comprise at least about 2%, about 2% to about 6%, about 3% to about 5%, or about 6% periclase by weight. The lithifying formula can comprise magnesium oxide, calcium sulfate, structurally bound water, or a combination thereof.

The composition may comprise a clay including, but not limited to, bentonite, montmorillonite, kaolinite, or a combination thereof. The clay can comprise at least about 60%, about 60% to about 80%, about 65% to about 75%, or about 80% clay by weight. The clay can also comprise 73.6% clay by weight. The clay can comprise at least about 12%, about 12% to about 25%, about 15% to about 20%, or about 25% feldspar by weight. The clay can also comprise about 19% feldspar by weight. The clay can comprise at least about 5%, about 5% to about 15%, about 10% to about 12%, or about 15% quartz by weight. The clay can also comprise about 9% quartz by weight. The clay can also comprise calcite, anhydrite, or a combination thereof. The clay can comprise at least about 4%, about 4% to about 12%, about 6% to about 10%, or about 12% structurally bound water by weight.

The composition can comprise at least about 2%, about 2% to about 10%, about 3% to about 9%, about 4% to about 8%, about 5% to about 6%, about 6% to about 7%, or about 10% lithifying formula by weight. The composition can comprise at least about 2%, about 2% to about 16%, about 4% to about 14%, about 6% to about 12%, about 8% to about 10%, or about 16% clay by weight. The composition can comprise at least about 0.3%, about 0.3% to about 0.4%, about 0.4% to about 0.5%, about 0.5% to about 0.6%, about 0.6% to about 0.7%, about 0.7% to about 0.8%, about 0.8% to about 0.9%, about 0.9% to about 1.0%, about 1.0% to about 1.2%, about 1.2% to about 1.4%, about 1.4% to about 1.6%, about 1.6% to about 1.8%, about 1.8% to about 2.0%, or about 2.0% metal oxide by weight. The metal oxide can be ferric oxide.

The composition for sorbing uranium can be comprised within a system for capping mineral tailings, the system comprising: a first layer comprising a composition for sorbing uranium; a second layer, wherein the second layer is impermeable; and a third layer. The third layer can be resistant to UV radiation damage and/or large temperature gradients. The large temperature gradients can comprise temperatures of at least about −50° C., about −50° C. to about 50° C., about −40° C. to about −40° C., about −30° C. to about 30° C., about −20° C. to about 20° C., about −10° C. to about 10° C., or about 50° C. The third layer can comprise a thickness of at least about 4 in., about 4 in. to about 8 in., about 5 in. to about 7 in., or about 8 in. The second layer can be resistant to cracking and infiltration. The second layer can comprise a thickness of at least about 12 in., about 12 in. to about 24 in., about 14 in. to about 22 in., about 16 in. to about 20 in., or about 24 in. The second layer can optionally be disposed on top of the first layer and the third layer can optionally be disposed on top of the second layer. The first layer can be disposed on top of uranium tailings and/or material. The layers can optionally be ordered such that water would have to sequentially pass through the third layer, followed by the second layer, followed by the first layer to reach the uranium tailings and/or material.

The composition for sorbing uranium can act as a uranium filter to remove uranium from groundwater and surface waters flowing through contaminated uranium tailings and/or material. The composition for sorbing uranium can comprise a porosity of at least about 20% (i.e., Ø≥20%). The composition for sorbing uranium can comprise a permeability of at least about 200 mD, i.e., k>200 mD. The composition for sorbing uranium can have geochemical properties that allow groundwater to flow and percolate through it. The composition for sorbing uranium can have a uranium sorption coefficient of at least about 10 (i.e., Kd≥10).

Uranium sorption capacity can occur by the direct capture of uranium from contaminated water by an ion exchange process wherein aqueous uranium species ($UO_2^{2+}$) dissolved in contaminated uranium tailings groundwater and/or uranium material according to the formula $H_2O+UO_2^{2+}$ reacts with clay and metal oxide complexation sites in composition for sorbing uranium. Uranium can be sorbed according to the reaction: $XOH+UO_2^{2+} \rightarrow XOUO_2^{+}+H^{+}$, where X is clay mixed with a metal oxide.

Although the text of the application and title are directed to uranium, the present invention can be used with other material to sorb other metals or metal oxides. The material can comprise, but is not limited to, mineral tailings, tailings, waste streams, mining deposits, waste material, leach fields, enclosed waste container, or a combination thereof. The term "uranium" as used throughout the application is intended to be used interchangeably with other metals. The metal or metal oxide may comprise, but is not limited to, neodymium ("Nd"), praseodymium ("Pr"), dysprosium ("Dy), copper ("Cu"), lithium ("Li"), sodium ("Na"), magnesium ("Mg"), potassium ("K"), calcium ("Ca"), titanium ("Ti"), vanadium ("V"), chromium ("Cr"), manganese ("Mn"), iron ("Fe"), cobalt ("Co"), nickel ("Ni"), cadmium ("Cd"), zinc ("Zn"), aluminum ("Al"), silicon ("Si"), silver ("Ag"), tin ("Sn"), platinum ("Pt"), gold ("Au"), bismuth ("Bi"), lanthanum ("La"), europium ("Eu"), gallium ("Ga"), scandium ("Sc"), strontium ("Sr"), yttrium ("Y"), zirconium ("Zr"), niobium ("Nb"), molybdenum ("Mo"), ruthenium ("Ru"), rhodium ("Rh"), palladium ("Pd"), indium ("In"), hafnium ("Hf"), tantalum ("Ta"), tungsten ("W"), rhenium ("Re"), osmium ("Os"), iridium ("Ir"), mercury ("Hg"), lead ("Pb"), polonium ("Po"), cerium ("Ce"), samarium ("Sm"), erbium ("Er"), ytterbium ("Yb"), thorium ("Th"), uranium ("U"), plutonium ("Pu"), terbium ("Tb"), promethium ("Pm"), tellurium ("Te"), or a combination thereof.

The metal oxide preferably comprises aluminum oxide ("$Al_2O_3$"), antimony trioxide ("$Sb_2O_3$"), antimony tetroxide ("$Sb_2O_4$"), antimony pentoxide ("$Sb_2O_5$"), arsenic trioxide ("$As_2O_3$"), arsenic pentoxide ("$As_2O_5$"), barium oxide ("BaO"), bismuth trioxide ("$Bi_2O_3$"), bismuth pentoxide ("$Bi_2O_5$"), calcium oxide ("CaO"), cerium trioxide ("$Ce_2O_3$"), cerium(IV) oxide ("$CeO_2$"), chromium(II) oxide ("CrO"), chromium(III) oxide ("$Cr_2O_3$"), chromium(IV) oxide ("$CrO_2$"), chromium(VI) oxide ("$CrO_3$"), cobalt(II) oxide ("CoO"), cobalt(II, III) oxide ("$Co_3O_4$"), cobalt(III) oxide ("$Co_2O_3$"), copper(I) oxide ("$Cu_2O$"), copper(II) oxide ("CuO"), iron(II) oxide ("FeO"), iron(II, III) oxide ("$Fe_3O_4$"), iron(III) oxide ("$Fe_2O_3$"), lanthanum oxide ("$La_2O_3$"), lead(II) oxide ("PbO"), lead(II, IV) oxide ("$Pb_3O_4$"), lead(IV) oxide ("$PbO_2$"), lithium oxide ("$Li_2O$"), magnesium oxide ("MgO"), manganese(II) oxide ("MnO"), manganese(III) oxide ("$Mn_2O_3$"), manganese(IV) ("$MnO_2$"), oxide manganese(VII) oxide ("$Mn_2O_7$"), mercury(II) oxide ("HgO"), nickel(II) oxide ("NiO"), nickel(III) oxide ("$Ni_2O_3$"), rubidium oxide ("$Rb_2O$"), silicon dioxide ("$SiO_2$"), silver(I) oxide ("$Ag_2O$"), thallium(I) oxide ("$Tl_2O$"), thallium(III) oxide ("$Tl_2O_3$"), thorium(IV) oxide ("$ThO_2$"), tin(II) oxide ("SnO"), tin(IV) oxide ("$SnO_2$"), uranium(VI) oxide ("$UO_2$"), tungsten(VI) oxide ("$WO_3$"), zinc oxide ("ZnO"), or a combination thereof.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A system for capping mineral tailings, the system comprising:

a first layer;

a second layer, wherein said second layer is impermeable; and a third layer comprising a composition for sorbing metal, wherein said third layer comprises a metal sorption coefficient of at least about 10.

2. The system of claim 1 wherein said composition for sorbing metal comprises:

calcium carbonate;

calcium alumino silicate;

a clay; and a metal oxide.

3. The system of claim 2 wherein said metal oxide comprises magnesium oxide.

4. The system of claim 1 wherein said composition for sorbing metal comprises an unconfined compressive strength of at least about 8 MPa.

5. The system of claim 1 wherein said composition for sorbing metal comprises a Young's modulus of at least about 2000 MPa.

6. The system of claim 2 wherein the metal is uranium.

7. The system of claim 1 wherein said first layer is at least partially disposed above said second layer and said third layer.

8. The system of claim 1 wherein said second layer is at least partially disposed above said third layer.

* * * * *